United States Patent
Levy et al.

(10) Patent No.: US 9,209,895 B2
(45) Date of Patent: Dec. 8, 2015

(54) METHOD OF CARRYING OUT FAST SWITCHING IN OPTICAL COMMUNICATION NETWORKS

(71) Applicant: ECI Telecom Ltd., Petach Tikva (IL)

(72) Inventors: Avi Levy, Ramat Gan (IL); Eyal Lichtman, Ramat Gan (IL)

(73) Assignee: ECI TELECOM LTD., Petach Tikva (IL)

( * ) Notice: Subject to any disclaimer, the term of this patent is extended or adjusted under 35 U.S.C. 154(b) by 0 days.

(21) Appl. No.: 14/263,669

(22) Filed: Apr. 28, 2014

(65) Prior Publication Data

US 2014/0321844 A1    Oct. 30, 2014

(30) Foreign Application Priority Data

Apr. 28, 2013 (IL) .......................................... 226035

(51) Int. Cl.
*H04B 10/00* (2013.01)
*H04B 10/032* (2013.01)

(52) U.S. Cl.
CPC .................................. *H04B 10/032* (2013.01)

(58) Field of Classification Search
CPC ............. H04J 14/0293; H04J 14/0294; H04J 14/0283; H04J 14/0227; H04J 14/0295; H04J 14/0287; H04J 14/029; H04J 14/0221; H04J 14/0291; H04B 10/032; H04B 10/038; H04B 10/07955; H04B 10/2916; H04B 10/564; H04Q 2011/0081; H04Q 2011/0043; H04Q 2011/0069; H04Q 2011/0083
USPC ....................... 398/5, 2, 12, 19, 38, 17, 20, 37
See application file for complete search history.

(56) References Cited

U.S. PATENT DOCUMENTS

| | | | | |
|---|---|---|---|---|
| 5,091,796 A | * | 2/1992 | Nishimura et al. | 398/2 |
| 5,889,610 A | * | 3/1999 | Fatehi et al. | 359/341.43 |
| 6,046,832 A | * | 4/2000 | Fishman | 398/45 |
| 6,160,648 A | * | 12/2000 | Oberg et al. | 398/4 |
| 6,580,530 B1 | * | 6/2003 | Arecco et al. | 398/5 |
| 6,587,241 B1 | * | 7/2003 | Saleh | 398/92 |
| 6,654,513 B1 | * | 11/2003 | Liden et al. | 385/24 |
| 7,231,146 B2 | * | 6/2007 | Arecco et al. | 398/32 |
| 7,260,324 B2 | * | 8/2007 | Passier et al. | 398/17 |
| 7,440,695 B2 | * | 10/2008 | Lee et al. | 398/28 |
| 8,045,851 B2 | * | 10/2011 | Lu et al. | 398/6 |
| 8,175,454 B2 | * | 5/2012 | Xia et al. | 398/21 |
| 8,433,190 B2 | * | 4/2013 | Wellbrock et al. | 398/2 |
| 8,879,903 B2 | * | 11/2014 | Ferrari et al. | 398/3 |
| 9,020,348 B2 | * | 4/2015 | Wigley et al. | 398/48 |
| 2003/0194233 A1 | * | 10/2003 | Casanova et al. | 398/2 |
| 2010/0080553 A1 | * | 4/2010 | Kerr et al. | 398/5 |

* cited by examiner

*Primary Examiner* — Hibret Woldekidan
(74) *Attorney, Agent, or Firm* — Browdy and Neimark, PLLC

(57) ABSTRACT

Method is provided for reducing adverse effects of a link failure in an optical network, wherein the optical network comprises at least one main link which comprises a first optical fiber amplifier (OFA), and along which communications traffic is currently being conveyed, and at least one protection link which comprises a second optical fiber amplifier (OFA) along which communications traffic is not currently being conveyed, wherein the at least one protection link is adapted to carry out communications traffic diverted from the at least one main link when a failure occurs at said at least one main link or at one or more nodes associated therewith, and wherein the method is further characterized in that when no communications traffic is being conveyed along the at least one protection link, one or more pumps of the second OFA is operating to provide an output having a pre-defined power level.

5 Claims, 4 Drawing Sheets

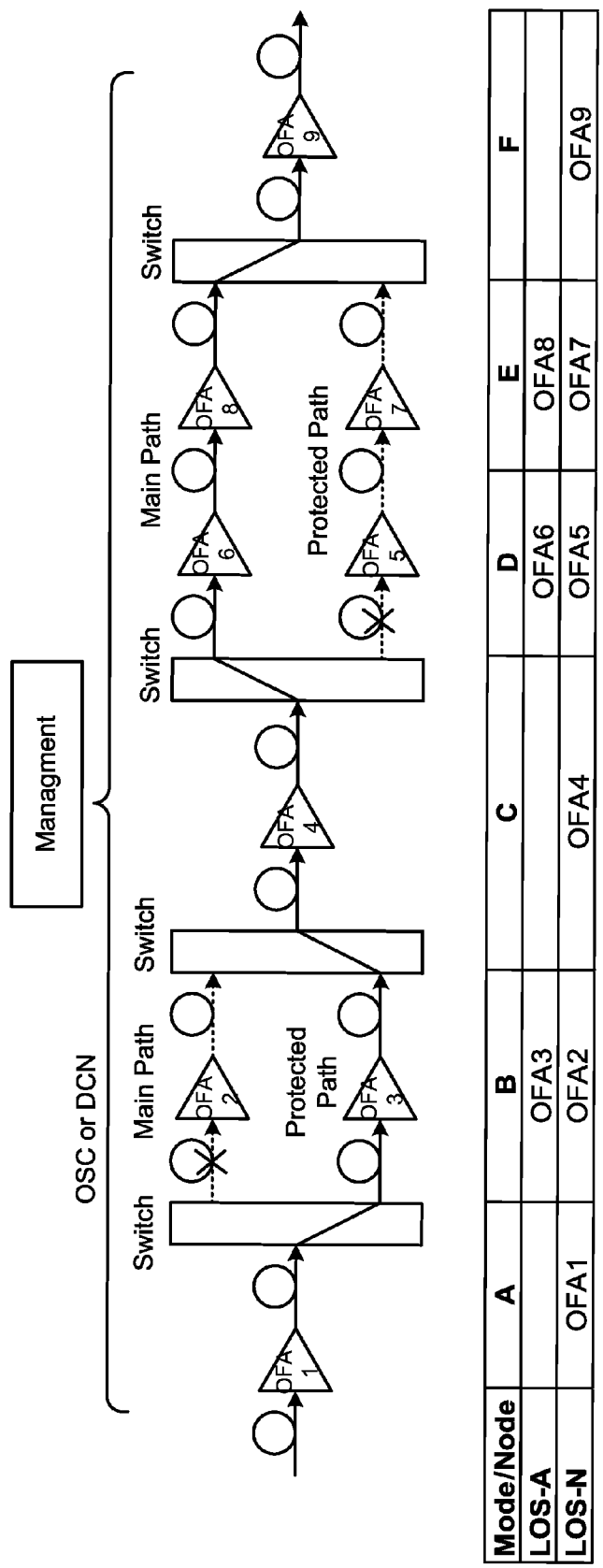

METHOD OF CARRYING OUT FAST SWITCHING IN OPTICAL COMMUNICATION NETWORKS

CROSS-REFERENCE TO RELATED APPLICATIONS

This application claims priority of Israel Patent Application No. 226035, filed Apr. 28, 2013, the disclosure of which is incorporated by reference herein in its entirety.

TECHNICAL FIELD

The invention relates to a method for use in an optical communication network, and in particularly to a method for carrying out fast switching in optical communication networks.

BACKGROUND

Optical communication systems are well known in the art. The need to switch sometimes from one traffic carrying path to another arises in any one of a number of instances, e.g. when there is an occasional fault occurring in one of the traffic carrying channels due to failing components, or when an expansion of the operating communication network is required, etc. Therefore, an auxiliary channel is usually incorporated in such systems, allowing the diversion of traffic being transmitted along one path, to another path. The latter path is sometimes referred to as a protection path/link. Conventional optic fibers based networks have implemented 1:1 redundancy for the optical links extending within the network, which relies on a certain amount of automatic switching. In these systems, when a loss of signal (to be referred to hereinafter as "LOS") or alarm indication signal ("AIS") conditions are noted for a link connecting two locations, a diversion of the traffic being transmitted takes place to the available redundant path. This diversion enables continuing with the transmission of data between such two locations.

In addition, with the evolving of optical networks, there is a growing need for using optical amplifiers. An optical amplifier is a device that amplifies an optical signal directly, without the need to first have it converted to an electrical signal, have it amplified, and then convert the amplified electrical signal to an optical signal for further conveying the latter along the transmission path. An optical amplifier may be considered as a laser device without an optical cavity, or one in which feedback from the cavity is suppressed.

Optical link protection usually incorporates a 1×2 or 2×2 optical switches in order to enable switching from the main path to the protected path as described above, when the use of the protection mode is required, e.g. when a fiber-cut occurs.

U.S. Pat. No. 7,551,857 describes an optical amplifier which may be quickly returned from a shutdown state to a regular operating mode after getting recovery information of a fault. In involves gain setting by Amplified Spontaneous Emission ("ASE") to the repeaters on the up-stream side during the shutdown state, and outputting ASE light with the same intensity as the Wave Division Muliplexed ("WDM") signal. Accordingly, before realizing the recovery of a shutdown, the gain setting is completed with the light whose intensity is within the safe criterion. After realizing the recovery of the shutdown, the optical transmission system can be returned quickly to the regular operating mode.

For an optical network which comprises a ring structure carrying a bi-directional optical data signal, US 20020181037 discloses a method for affecting failure protection method by which when no signal is detected at a primary pre-amplifier located at one of the network hubs (used for pre-amplifying a primary optical signal received from a first direction along the ring structure), the primary pre-amplifier is shut down and a secondary pre-amplifier, which is located at the one network hub for pre-amplifying a redundant optical signal corresponding to the optical signal and received from the opposing direction along the ring structure, is powered up.

However, when switching to the protected path, there is a concern that the link Optical Fiber Amplifiers (OFA's) or other active elements will be shutdown during the diversion of the traffic from the main optical link to the protection link, which in turn might result in a too long recovery period for these elements (e.g. say about 100 ms). In addition, different parts of the protected link require different shutdown rules.

Therefore, a method is required for OFA's shutdown that addresses these requirements, in order to guarantee a fast protection switching of less than about 50 ms.

SUMMARY OF THE DISCLOSURE

The disclosure may be summarized by referring to the appended claims.

It is an object of the present invention to provide a method to enable fast diversion of communications traffic from a link carrying that traffic and experiencing a failure to its protecting link, wherein both links comprise OFAs.

It is another object of the present invention to provide a method to enable fast diversion of communications traffic from a main link carrying that traffic and experiencing a failure to its protecting link, wherein both links comprise OFAs, and wherein the main link is part of a partially protected path.

It is still another object of the present invention to provide a method to enable fast diversion of communications traffic from a main link carrying that traffic and experiencing a failure to its protecting link, wherein both links comprise OFAs, and wherein the main link is part of a fully protected path.

Other objects of the present invention will become apparent from the following description.

According to a first embodiment there is provided a method is provided for reducing adverse effects of a link failure in an optical network, wherein the optical network comprises at least one main link which comprises a first optical fiber amplifier (OFA), and along which communications traffic is currently being conveyed, and at least one protection link which comprises a second optical fiber amplifier (OFA) along which communications traffic is not currently being conveyed, wherein the at least one protection link is adapted to carry out communications traffic diverted from the at least one main link when a failure occurs at said at least one main link or at one or more nodes associated therewith, and wherein the method is further characterized in that when no communications traffic is being conveyed along the at least one protection link (so that there is no power input to the OFA pumps), still, one or more pumps of the second OFA is operating to provide an output having a pre-defined power level.

Consequently, when a failure occurs at the main link or at a node associated therewith and communications traffic is about to be diverted to the protection link, this diversion can be made at a substantially shorter period as the second OFA is already at operative condition.

According to another embodiment, the one or more operating pumps of the second OFA operate continuously during a given period of time. In the alternative, each of the one or more pumps operates during a different period of time than the other(s).

By yet another embodiment, when no communications traffic is conveyed through the second OFA, the respective output power thereof, is set to a pre-determined value.

In accordance with another embodiment, the first OFA is operative in a LOS-N mode where there is no shutdown of that first OFA when a LOS is detected, or is operative by shifting between a LOS-N mode and a LOS-A mode (by the latter mode the OFA undergoes shutdown after a LOS detection) and wherein the shifting between modes is carried out every time a loss of signal ("LOS") is detected.

By still another embodiment, the main link is a protected link which constitutes a part of a non-protected path (i.e. a path that is only partially and not fully protected) and wherein the main link is operative according to the LOS-N mode. Preferably, if the LOS condition exceeds a pre-defined period of time (e.g. if it exceeds 50 msec) the LOS-N mode associated with the main link would be replaced by a LOS-A mode.

According to another embodiment, the main link is a protected link comprised in a protected path (i.e. a fully protected path that) and wherein the main link is operative according to the LOS-N mode. Preferably, when a LOS is detected for this link, the traffic will be diverted to the respective protecting link and the operating mode at the main link is then set to LOS-A mode.

Other aspects of the present invention such as a communication apparatus and a system which are adapted to operate in accordance with the principles described herein, mutatis mutandis, are encompassed within the scope of the present invention.

BRIEF DESCRIPTION OF THE DRAWINGS

For a more complete understanding of the present invention, reference is now made to the following detailed description taken in conjunction with the accompanying drawings wherein:

FIG. 4—illustrates another embodiment of the invention for network management control-plane shutdown configuration.

DETAILED DESCRIPTION

In this disclosure, the term "comprising" is intended to have an open-ended meaning so that when a first element is stated as comprising a second element, the first element may also include one or more other elements that are not necessarily identified or described herein, or recited in the claims.

In the following description, for the purposes of explanation, numerous specific details are set forth in order to provide a better understanding of the present invention by way of examples. It should be apparent, however, that the present invention may be practiced without these specific details.

Figure 1A:
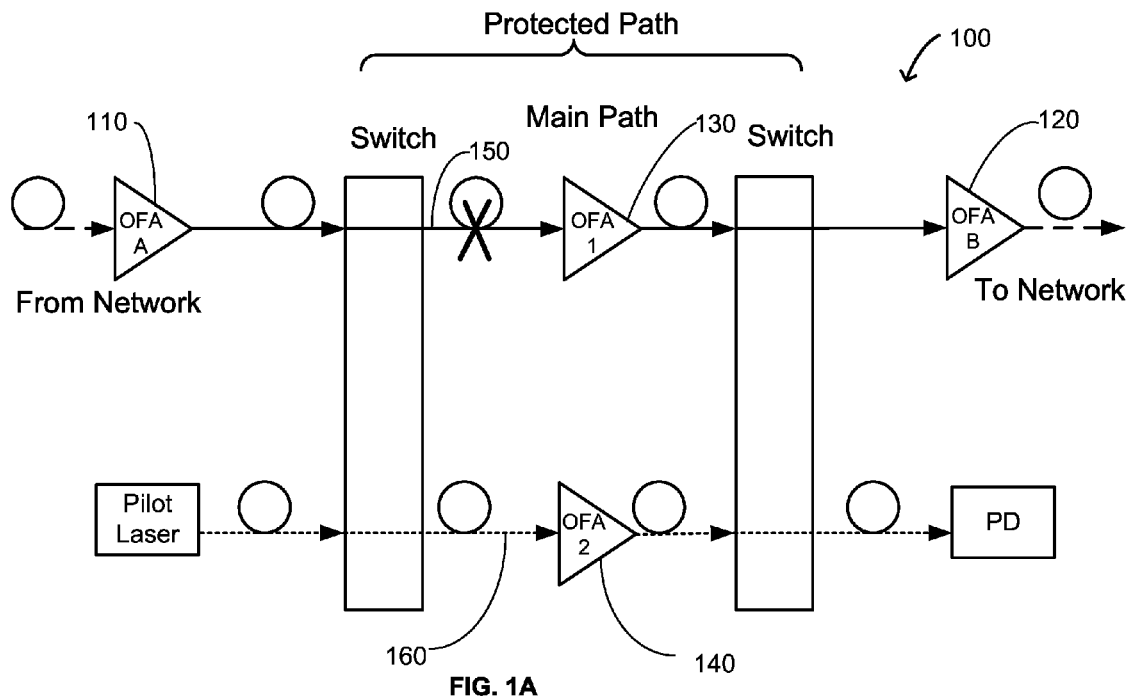
FIG. 1A—illustrates an example of an optical communication system operating in a normal mode before the occurrence of a fiber-cut in the main path of a protected link.

FIG. 1A illustrates an optical communication system 100 operating under normal operating conditions wherein traffic is being conveyed along the main path 150 which comprises OFA A (110), OFA 1 (130) and OFA B (120). In a case where a fiber cut occurs along the main path (before the location of OFA 1), both OFA A and OFA B should not undergo shutdown, while OFA 1 (130) should be shutdown fast as it is part of the active (signal) path where the LOS has occurred. OFA 2 (140) located along the non-active (protection) path (160), should start functioning as soon as possible without undergoing a shutdown.

Figure 1B:
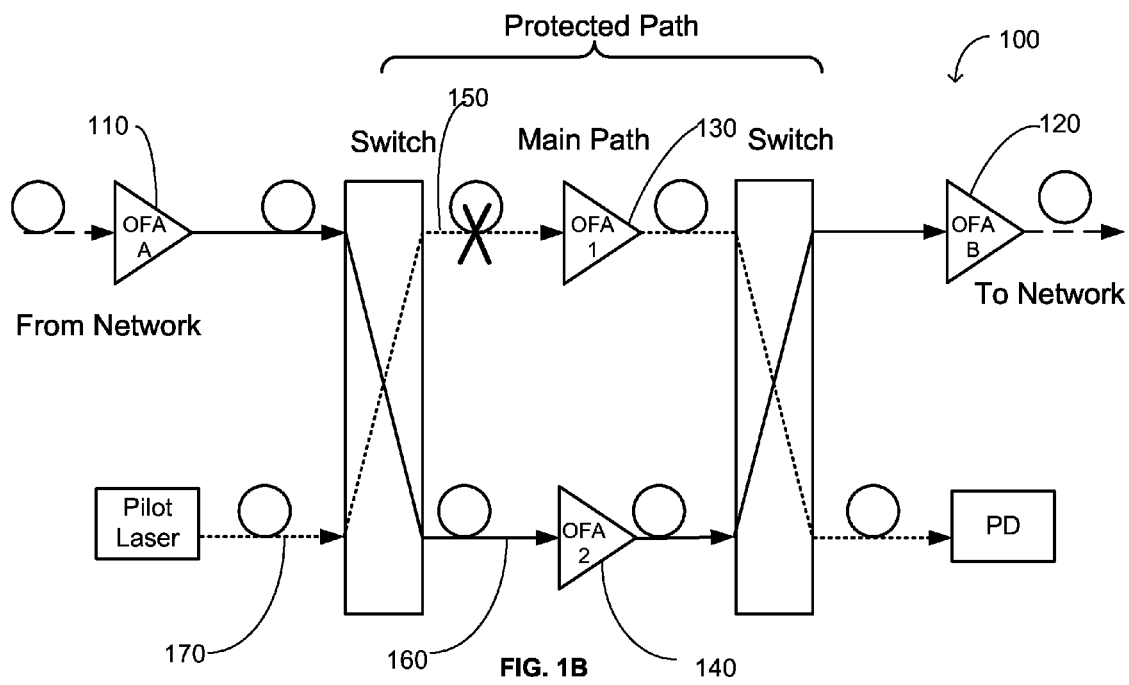
FIG. 1B—illustrates switching to the protected path after detecting a fiber-cut in the main path of the system illustrated in FIG. 1A.

FIG. 1B illustrates the operating mode of system 100 of FIG. 1A, following the detection of the fiber cut that occurred along the main path. As was previously explained, when switching to the protected path, there is a concern that the Optical Fiber Amplifiers (OFAs) located along the link, or other active elements will be shutdown during the diversion of the traffic from the main optical link to the protection optical link, which in turn might cause a too long recovery period for these elements (e.g. say about 100 ms). In addition, different parts of the protected link may require implementation of different shutdown rules.

Therefore, the present invention provides a method for OFA's shutdown that addresses these requirements, in order to enable a fast protection switching in case of a loss of the optical signal and in turn the diversion of the communications traffic to a protection link (or protection path).

According to an embodiment of the invention there are three protection operating modes which may preferably be used for OFA shutdown when a LOS is detected, namely:

1. nPL (non-Protected Link)—A default option.
2. PLnPP (Protected Link non-Protected Path)—A mode suitable for OFAs installed in a configuration such as OFA A and OFA B presented in FIGS. 1A and 1B.
3. PLPP (Protected Link Protected Path)—A mode suitable for OFAs installed in a configuration such as that of OFAs 1 and 2 shown in FIGS. 1A and 1B.

These modes may be used while defining the OFA shutdown under one or both following conditions:
LOS-A=Shutdown after LOS detection; and
LOS-N=No shutdown after LOS detection.

Under the LOS-N condition, the OFA pumps continue to operate even though there is no input power to the OFA pumps, in which case the respective output power is set to a pre-determined value of Pout(min), which enables fast recovery when eventually the input power is resumed. By alternating LOS-N & LOS-A when operating under the PPLP mode, both fast shutdown in the signal path (150) and absorption in the pilot path (170) are maintained, as presented in the embodiment illustrated in FIG. 1B.

In other words, according to an embodiment of the invention, the method provided allows setting the relevant amplifiers (e.g. EDFAs) at a LOS-N operating mode or at LOS-A operating mode, according to which path is used as the active (main) path and which path is used as the protection path. The solution provided by the present invention enables the operator to turn-off immediately the EDFAs located along the main path (LOS-A) when a fiber cut occurs, thereby causing the switching to the protection path to occur as fast as possible, while EDFAs located along the protection/non-active link are maintained in the LOS-N operating mode so that they are kept active even after the detection of a LOS, so that the signal may recover with no (or minimal) delay after switching.

Figure 2:
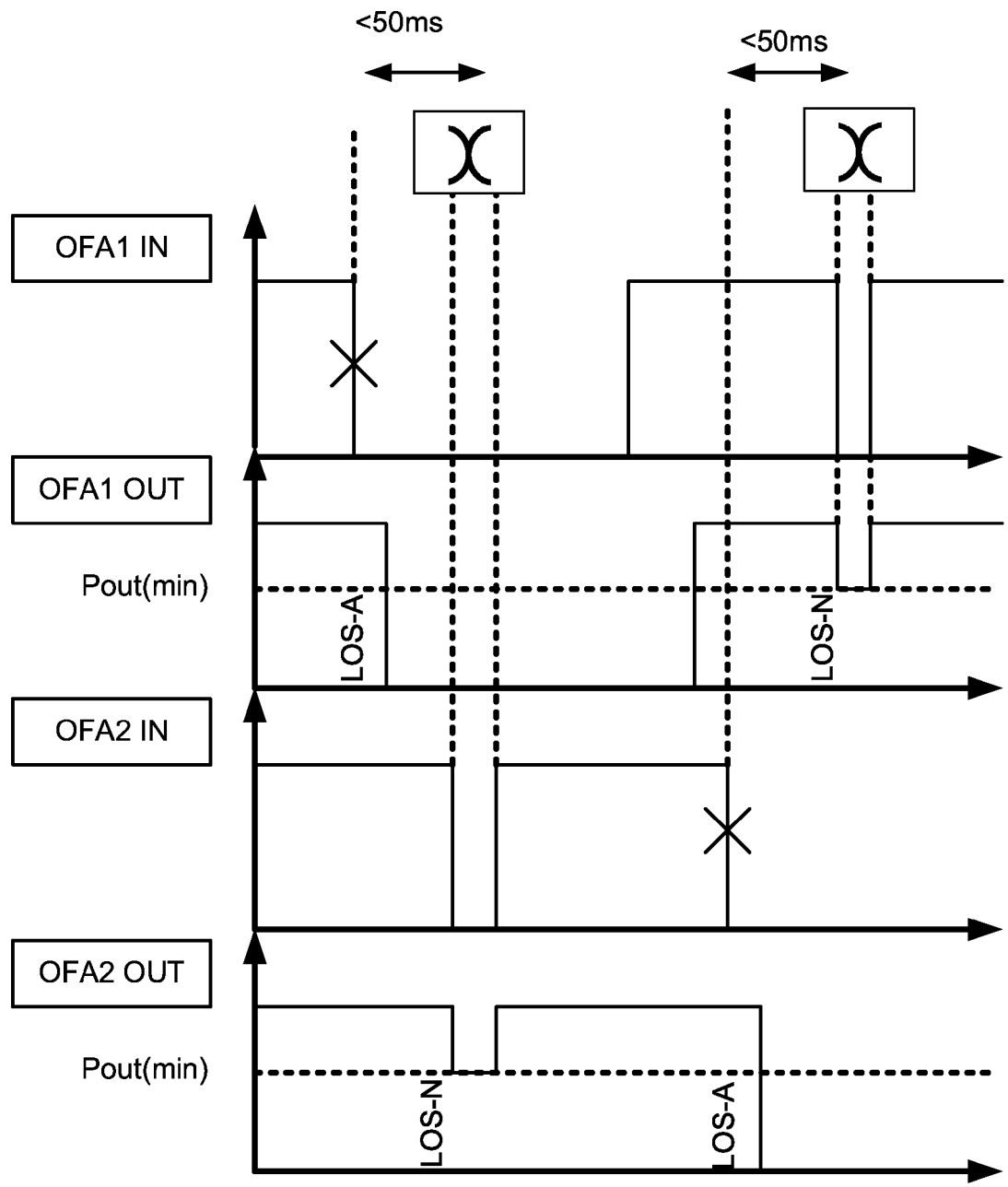
FIG. 2—illustrates a PPLP shutdown timing diagram.

FIG. 2 illustrates an example of an embodiment of the present invention in which the method being used relies on a pre-configuration of the protection operation mode. In this embodiment, after tracking the (input) LOS alarm and/or the (output) LOP alarm, fast protection switching is maintained.

Figure 3:
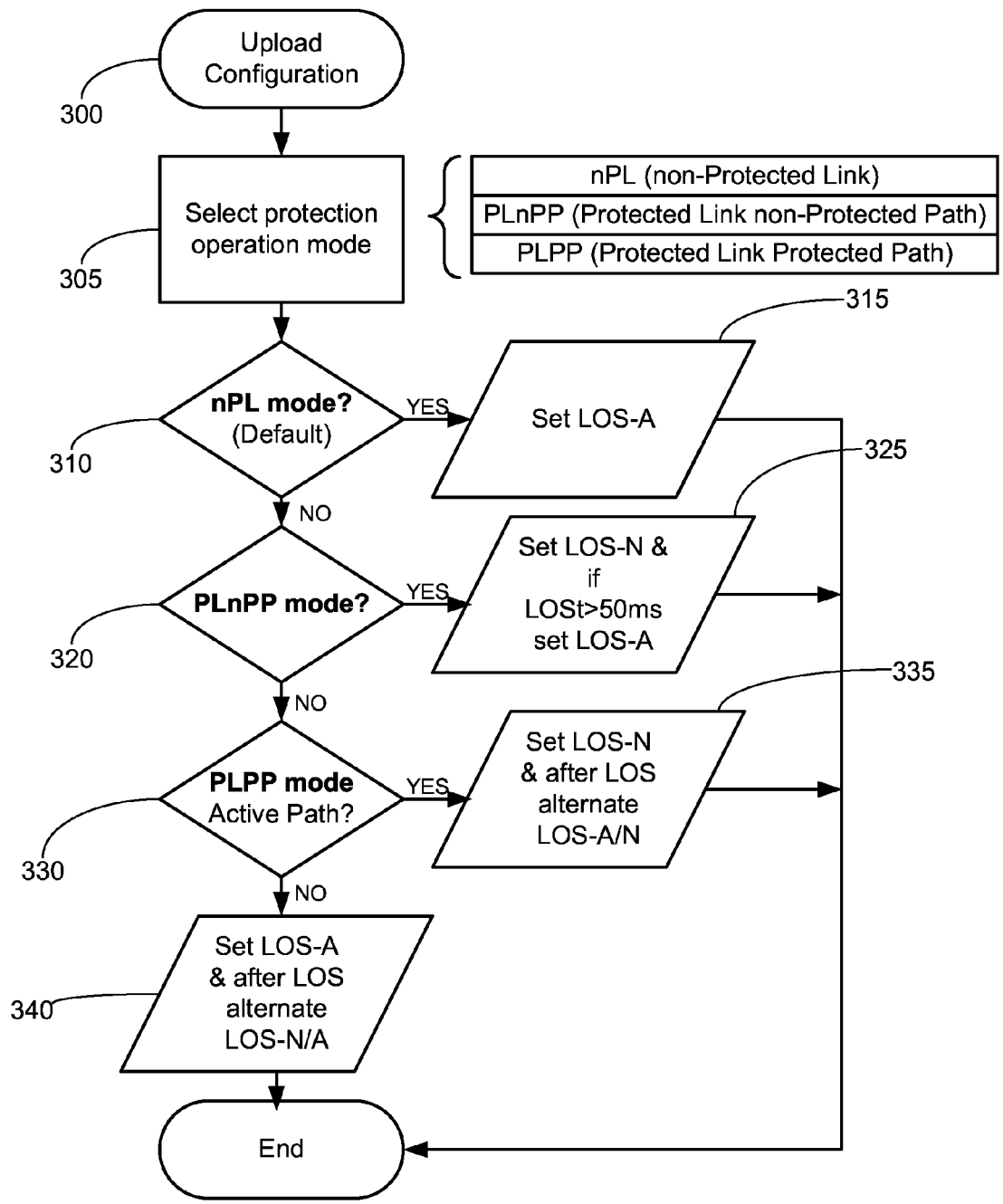
FIG. 3—demonstrates a flowchart for carrying out a shutdown algorithm in accordance with an embodiment of the present invention.

FIG. 3 demonstrates a flowchart for carrying out a shutdown algorithm in accordance with an embodiment of the present invention.

According to this embodiment, after having uploaded the network configuration (step 300), a protection type is selected (step 305) for the various links/paths from among the following options: nPL (non-Protected Link); PLnPP (Protected Link non-Protected Path) and PLPP (Protected Link Protected Path).

If the nPL mode has been selected (step 310) for a given link (which is preferably the default selection for each link unless specified otherwise), i.e. the link is a non-protected link, a LOS-A condition is set (step 315) for this link, which means that a shutdown will occur in response to a detection of LOS at for that link, and the procedure ends for that link.

If a PLnPP mode has been selected (step 320) for a given link (which means that the link is protected and is part of a non-protected path), a LOS-N condition is set (step 325) for that link, but whenever the LOS condition associated with this link extends for a period of time that exceeds 50 msec, the LOS-N condition is replaced with a LOS-A condition for the link, which means that a shutdown will occur in response to a changing the mode from LOS-N to LOS-A, as if the LOS has been just detected, and the procedure would then end for that link.

In the case that a PLPP mode has been selected (step 330) for a given link (which means that the link is protected and is part of a protected path), a LOS-N condition is set (step 335) for that link. If a LOS condition associated with this link is detected, the traffic will be diverted to the respective protecting link/path and the condition at the link where LOS has been detected will be set to LOS-A condition (step 340). Consequently, the link which carried the traffic prior to the LOS detection is set for condition LOS-A, whereas the protecting link carrying the traffic after the LOS has been detected is set to LOS-N condition. Then, once a failure is detected at the protecting link a reverse procedure will occur, by which the traffic will be diverted back to the original link, the protecting link will be set to condition LOS-A, whereas the original link to which the traffic has now been diverted is set again to condition LOS-N. The above described procedure for switching from one link to another is repeated every time a LOS is detected.

If no condition has been set for a particular link, a LOS-A condition is assigned for that link. If a LOS condition associated with this link is detected, the link status will be changed to condition LOS-N. When a further failure occurs, the link will be set again to condition LOS-A.

While the preceding embodiment provides a method which may be considered as a simple solution for a sophisticated network behavior, one that does not rely on the use of a control-plane and/or system management, the following embodiment provides a method that takes advantage of an available control-plane and the ability of the network management to trail and to monitor the signal path.

Thus, FIG. 4 illustrates another embodiment of the invention for network management control-plane shutdown configuration. The method provided by this embodiment, comprises configuring and monitoring the shutdown mechanism via the network management control-plane. Each node reports the signal path and all OFAs will be configured accordingly, making them ready for a rapid protection switching in any fiber-cut scenario, similarly to that described above, mutatis mutandis.

In the description and claims of the present application, each of the verbs, "comprise" "include" and "have", and conjugates thereof, are used to indicate that the object or objects of the verb are not necessarily a complete listing of members, components, elements or parts of the subject or subjects of the verb.

The present invention has been described using detailed descriptions of embodiments thereof that are provided by way of example and are not intended to limit the scope of the invention in any way. The described embodiments comprise different features, not all of which are required in all embodiments of the invention. Some embodiments of the present invention utilize only some of the features or possible combinations of the features. Variations of embodiments of the present invention that are described and embodiments of the present invention comprising different combinations of features noted in the described embodiments will occur to persons of the art. The scope of the invention is limited only by the following claims.

The invention claimed is:

1. A method for reducing adverse effects of a link failure in an optical network, wherein the optical network comprises at least one main link which comprises a first optical fiber amplifier (OFA), and along which communications traffic is currently being conveyed, and at least one protection link which comprises a second optical fiber amplifier (OFA) along which communications traffic is not currently being conveyed, wherein the at least one protection link is adapted to carry out communications traffic diverted from the at least one main link when a failure occurs at said at least one main link or at one or more nodes associated therewith, and wherein the method is further characterized in that when no communications traffic is being conveyed along the at least one protection link, one or more pumps of the second OFA is operating to provide an output having a pre-defined power level, and wherein the first OFA is operative by a LOS-N operating mode where there is no shutdown of the first OFA when a LOS is detected, or is operative by shifting between LOS-N operating mode and LOS-A operating mode in which the first OFA undergoes shutdown after LOS detection, and wherein the shifting between said two modes is carried out every time a LOS is detected.

2. A method for reducing adverse effects of a link failure in an optical network, wherein the optical network comprises at least one main link which comprises a first optical fiber amplifier (OFA), and along which communications traffic is currently being conveyed, and at least one protection link which comprises a second optical fiber amplifier (OFA) along which communications traffic is not currently being conveyed, wherein the at least one protection link is adapted to carry out communications traffic diverted from the at least one main link when a failure occurs at said at least one main link or at one or more nodes associated therewith, and wherein the method is further characterized in that when no communications traffic is being conveyed along the at least one protection link, one or more pumps of the second OFA is operating to provide an output having a pre-defined power level, wherein the first OFA is operative by a LOS-N operating mode where there is no shutdown of the first OFA when a LOS is detected, or is operative by shifting between LOS-N operating mode and LOS-A operating mode in which the first OFA undergoes shutdown after LOS detection, and wherein the shifting between said two modes is carried out every time a LOS is detected, and wherein the main link is a protected link comprised in a non-protected path and wherein the main link is operative according to the LOS-N operating mode.

3. The method of claim 2, wherein if the LOS condition exceeds a pre-defined period, the LOS-N operating mode for said main link is replaced with a LOS-A operating mode.

4. A method for reducing adverse effects of a link failure in an optical network, wherein the optical network comprises at least one main link which comprises a first optical fiber amplifier (OFA), and along which communications traffic is currently being conveyed, and at least one protection link which comprises a second optical fiber amplifier (OFA) along which communications traffic is not currently being conveyed, wherein the at least one protection link is adapted to carry out communications traffic diverted from the at least one main link when a failure occurs at said at least one main link or at one or more nodes associated therewith, and wherein the method is further characterized in that when no communications traffic is being conveyed along the at least one protection link, one or more pumps of the second OFA is operating to provide an output having a pre-defined power level, wherein the first OFA is operative by a LOS-N operating mode where there is no shutdown of the first OFA when a LOS is detected, or is operative by shifting between LOS-N operating mode and LOS-A operating mode in which the first OFA undergoes shutdown after LOS detection, and wherein the shifting between said two modes is carried out every time a LOS is detected, and wherein the main link is a protected link comprised in a protected path and wherein the main link is operative according to the LOS-N operating mode.

5. The method of claim 4, wherein if a LOS is detected for said main link, communications traffic is diverted to the protecting link and the operating mode for said main link is set to LOS-A mode.

\* \* \* \* \*